US011978474B2

(12) United States Patent
Margoles et al.

(10) Patent No.: US 11,978,474 B2
(45) **Date of Patent: *May 7, 2024**

(54) DETECTION AND ANALYSIS OF PERCUSSIVE SOUNDS

(71) Applicant: Comcast Cable Communications, LLC, Philadelphia, PA (US)

(72) Inventors: Ryan Margoles, Denver, CO (US); Sean Fendt, Denver, CO (US); Bryan Loughry, Lafayette, CO (US); Brett Jurgens, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 187 days.

This patent is subject to a terminal disclaimer.

(21) Appl. No.: 17/304,916

(22) Filed: Jun. 28, 2021

(65) Prior Publication Data

US 2021/0383821 A1 Dec. 9, 2021

Related U.S. Application Data

(63) Continuation of application No. 16/774,712, filed on Jan. 28, 2020, now Pat. No. 11,069,371, which is a (Continued)

(51) Int. Cl.
*H04R 29/00* (2006.01)
*G08B 13/16* (2006.01)

(Continued)

(52) U.S. Cl.
CPC .......... *G10L 25/51* (2013.01); *G08B 13/1672* (2013.01); *G08B 21/18* (2013.01);

(Continued)

(58) Field of Classification Search
CPC ..... G10L 25/51; G08B 13/1672; G08B 21/18; H04R 1/46; H04R 17/02
See application file for complete search history.

(56) References Cited

U.S. PATENT DOCUMENTS 5,504,717 A * 4/1996 Sharkey .................. G01S 3/801
367/129
5,608,377 A 3/1997 Zhevlev et al.

(Continued)

OTHER PUBLICATIONS

U.S. Appl. No. 15/369,237, filed Dec. 5, 2016 Non-Final Rejection dated Sep. 29, 2017, all pages.

(Continued)

*Primary Examiner* — Simon King
(74) *Attorney, Agent, or Firm* — BakerHostetler

(57) ABSTRACT

A system is disclosed for detecting and correlating percussive sounds with previously identified spectral signatures of a plurality of events so as to notify a user of an occurrence of a particular event. The system may include a sensor component which includes a piezoelectric transducer at a periphery of the sensor component for coupling with a surface and converting percussive sounds from the surface into an electrical signal. The sensor component may also include a local processor configured to produce a data signal based on the electrical signal, and a communication device for sending the data signal to a remote processor. The system may also include a remote processor configured to receive the data signal and compare the data signal to at least one reference signal and send a notification to a user based at least in part on the data signal correlating to at least one reference signal.

28 Claims, 3 Drawing Sheets

Related U.S. Application Data continuation of application No. 16/113,882, filed on Aug. 27, 2018, now Pat. No. 10,593,348, which is a continuation of application No. 15/369,237, filed on Dec. 5, 2016, now Pat. No. 10,062,395.

(60) Provisional application No. 62/262,609, filed on Dec. 3, 2015.

(51) Int. Cl.

| | |
|---|---|
| ***G08B 21/18*** | (2006.01) |
| ***G10L 25/51*** | (2013.01) |
| ***H04R 1/46*** | (2006.01) |
| ***H04R 17/02*** | (2006.01) |
| *G10L 25/72* | (2013.01) |

(52) U.S. Cl.

CPC ............... *H04R 1/46* (2013.01); *H04R 17/02* (2013.01); *G10L 25/72* (2013.01)

(56) References Cited

U.S. PATENT DOCUMENTS

| | | | | |
|---|---|---|---|---|
| 5,675,320 | A | 10/1997 | Cecic et al. | |
| 5,917,410 | A | 6/1999 | Cecic et al. | |
| 8,917,186 | B1 | 12/2014 | Grant | |
| 10,062,395 | B2 | 8/2018 | Margoles et al. | |
| 10,593,348 | B2 | 3/2020 | Margoles et al. | |
| 11,069,371 | B2 | 7/2021 | Margoles et al. | |
| 2003/0079600 | A1 | 5/2003 | De Moraes | |
| 2005/0068176 | A1 | 3/2005 | Ko | |
| 2005/0131705 | A1 | 6/2005 | Gandhi et al. | |
| 2006/0017558 | A1* | 1/2006 | Albert | G08B 3/10 340/521 |
| 2006/0017561 | A1* | 1/2006 | Albert | G08B 21/22 340/521 |
| 2006/0017579 | A1* | 1/2006 | Albert | G08B 17/00 340/628 |
| 2007/0146127 | A1* | 6/2007 | Stilp | G08B 1/08 340/539.1 |
| 2008/0106422 | A1 | 5/2008 | Sparks et al. | |
| 2008/0163745 | A1* | 7/2008 | Isozaki | G10H 1/40 84/622 |
| 2009/0058630 | A1 | 3/2009 | Friar et al. | |
| 2010/0086137 | A1 | 4/2010 | Nicolino et al. | |
| 2010/0142715 | A1* | 6/2010 | Goldstein | G10L 25/51 707/769 |
| 2010/0183160 | A1 | 7/2010 | Cosgrove et al. | |
| 2010/0327766 | A1 | 12/2010 | Recker et al. | |
| 2011/0084807 | A1* | 4/2011 | Logan | H04W 4/029 340/10.1 |
| 2011/0254681 | A1 | 10/2011 | Perkinson et al. | |
| 2011/0298616 | A1 | 12/2011 | Foisy et al. | |
| 2012/0026726 | A1 | 2/2012 | Recker et al. | |
| 2013/0039497 | A1 | 2/2013 | Ramalho et al. | |
| 2014/0253326 | A1* | 9/2014 | Cho | H04W 4/90 340/539.11 |
| 2014/0266708 | A1 | 9/2014 | Warren et al. | |
| 2015/0029020 | A1 | 1/2015 | Bailey et al. | |
| 2015/0100167 | A1* | 4/2015 | Sloo | G08B 29/02 700/278 |
| 2015/0109112 | A1* | 4/2015 | Fadell | G08B 19/005 340/328 |
| 2015/0110279 | A1 | 4/2015 | Tejerina | |
| 2015/0154850 | A1* | 6/2015 | Fadell | G06Q 10/083 340/501 |
| 2015/0279198 | A1 | 10/2015 | Gu et al. | |
| 2015/0355649 | A1 | 12/2015 | Ovadia | |
| 2015/0379836 | A1* | 12/2015 | Nye | G08B 13/02 340/565 |
| 2016/0123618 | A1 | 5/2016 | Hester et al. | |
| 2016/0123619 | A1 | 5/2016 | Hester et al. | |
| 2016/0300477 | A1 | 10/2016 | Pickford et al. | |
| 2018/0106422 | A1 | 4/2018 | Saika et al. | |
| 2018/0343141 | A1 | 11/2018 | Scalisi et al. | |
| 2020/0082679 | A1 | 3/2020 | Scalisi et al. | |

OTHER PUBLICATIONS

U.S. Appl. No. 15/369,237, filed Dec. 5, 2016 Notice of Allowance, dated May 2, 2018, all pages.

US Patent Application filed on Jun. 16, 2021, entitled “Detection and Analysis of Percussive Sounds”, U.S. Appl. No. 17/349,605.

US Patent Application filed on Aug. 27, 2018, entitled “Spectral Recognition of Percussive Sounds”, U.S. Appl. No. 16/113,882.

US Patent Application filed on Dec. 5, 2016, entitled “Spectral Recognition of Percussive Sounds”, U.S. Appl. No. 15/369,237.

* cited by examiner

DETECTION AND ANALYSIS OF PERCUSSIVE SOUNDS

CROSS-REFERENCE TO RELATED APPLICATIONS

This application is a continuation of U.S. patent application Ser. No. 16/774,712, filed Jan. 28, 2020, which is a continuation of U.S. patent application Ser. No. 16/113,882 filed Aug. 27, 2018, now U.S. Pat. No. 10,593,348, entitled "SPECTRAL RECOGNITION OF PERCUSSIVE SOUNDS", which is a continuation of U.S. patent application Ser. No. 15/369,237 filed Dec. 5, 2016, now U.S. Pat. No. 10,062,395, entitled "SPECTRAL RECOGNITION OF PERCUSSIVE SOUNDS", which claims priority to Provisional U.S. Patent Application No. 62/262,609 filed Dec. 3, 2015, entitled "SPECTRAL RECOGNITION OF PERCUSSIVE SOUNDS VIA PIEZOELECTRIC TRANSDUCER", the entire disclosures of which are hereby incorporated by reference, for all purposes, as if fully set forth herein.

BRIEF DESCRIPTION OF THE INVENTION

In one embodiment, a system for detecting and correlating percussive sounds with previously identified spectral signatures of a plurality of events so as to notify a user of an occurrence of a particular event is provided. The system may include a sensor component and a remote processor. The sensor component may include a piezoelectric transducer at a periphery of the sensor component for coupling the sensor component with a surface and converting percussive sounds from the surface into an electrical signal. The sensor component may also include a local processor configured to produce a data signal based on the electrical signal. The sensor component may also include a communication device for sending the data signal to a remote processor. The remote processor may be configured to receive the data signal and compare the data signal to at least one reference signal. The remote processor may also be configured to send a notification to a user based at least in part on the data signal correlating to at least one reference signal.

In another embodiment, a system for detecting and correlating percussive sounds with previously identified spectral signatures of a plurality of events so as to notify a user of an occurrence of a particular event is provided. The system may include at least one processor and at least one non-transitory machine readable medium. The non-transitory machine-readable medium may have instructions thereon, which are executable by the at least one processor to perform a method. The method may include receiving an electrical signal from a piezoelectric transducer. The method may also include producing a data signal based on the electrical signal. The method may further include comparing the data signal to at least one reference signal. The method may additionally include sending a notification to a user based at least in part on the data signal correlating to at least one reference signal.

In another embodiment, a method for detecting and correlating percussive sounds with previously identified spectral signatures of a plurality of events so as to notify a user of an occurrence of a particular event is provided. The method may include receiving an electrical signal from a piezoelectric transducer. The method may also include producing a data signal based on the electrical signal. The method may further include comparing the data signal to at least one reference signal. The method may additionally include sending a notification to a user based at least in part on the data signal correlating to at least one reference signal.

BRIEF DESCRIPTION OF THE DRAWINGS

The present invention is described in conjunction with the appended figures.

Figure 1:
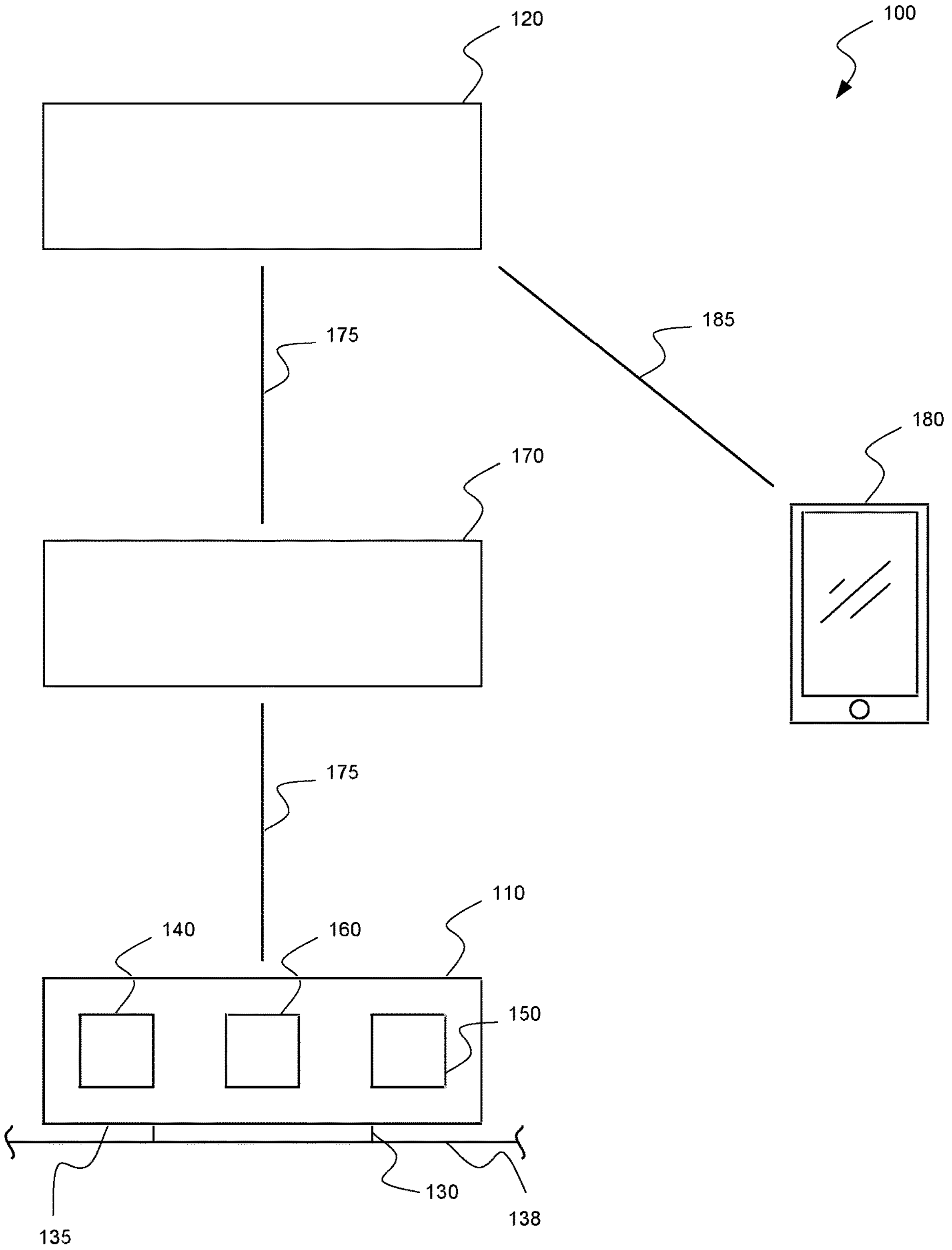
FIG. 1 is a representative block diagram of one apparatus embodiment of the invention for detecting and correlating percussive sounds with previously identified spectral signatures of a plurality of events so as to notify a user of an occurrence of a particular event.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment of the invention, a system is provided for detecting and correlating percussive sounds with previously identified spectral signatures of a plurality of events so as to notify a user of an occurrence of a particular event is provided. Turning to FIG. 1, the system 100 may include a sensor component 110 and a remote processor 120. Other elements may be present in various embodiments as will be described below.

Sensor component 110 may include a piezoelectric transducer 130 at a periphery 135 of the sensor component 110 for coupling sensor component 110 with a surface 138 and converting percussive sounds from surface 138 into an electrical signal. In some embodiments, another type of transducer may be employed in the place of, or in addition to piezoelectric transducer 130.

Sensor component 110 may also include a local processor 140 configured to produce a data signal based on the electrical signal. Local processor 140 may also perform any other function discussed herein. Sensor component 110 may also include a communication device 150 for sending the data signal to remote processor 120. Merely by way of example, communication device 150 may include a radio transmitter such as a IEEE 802.11 Wi-Fi transmitter. In some embodiments, Sensor component 110 may also include a power source 160 such as a battery (rechargeable or disposable). Individual subcomponents of sensor component may be in communication with each other and other subcomponents.

To produce the data signal based on the electrical signal from piezoelectric transducer 130, local processor 140 may perform a Fourier transform, or other type of spectral analysis, on the electrical signal. Any process which allows for a signal to be produced which is representative of the electrical signal may be employed depending on the embodiment.

Remote processor 120 may be configured to receive the data signal and compare the data signal to at least one reference signal. Remote processor 120 may receive the data signal via a semi-local router 170 and network communications 175 there-through, including via the Internet.

Remote processor 120 may have access to a database of reference signals, each correlating to a different known acoustic/spectral signature. In this manner, by using various search/comparison algorithms, the known acoustic/spectral signature which correlates to some minimum threshold with the data signal can be identified. In this manner, the event associated with the known acoustic/spectral signature can be determined. Merely by way of example, the database of reference signals may include reference signals for any number of events, including, but not limited to: a doorbell sound, a smoke alarm sound, a carbon monoxide alarm sound, a security alarm sound, a door ajar alarm sound, a glass breaking sound, a door opening sound, a water flowing sound; and a collision sound.

Remote processor 120 may also be configured to send a notification to a user based at least in part on the data signal correlating to at least one reference signal. In some embodiments this may include sending an email to the user, which would be obtained through a prior registration process completed by the user. In these and other embodiments, the notification could also include sending a message to a software application on a mobile device 180 of the user via a telecommunication/data network 185. Other forms of notification may also be possible. The notification may identify to the user the event or events associated with the correlated reference signal (e.g., breaking class, smoke alarm, etc.).

In some embodiments, local processor 140 may also be configured to perform power saving functions in order to prolong the usefulness of power source 160. Merely by way of example, local processor 140 may be further configured to determine if the electrical signal indicates that the percussive sounds exceed a predefined amplitude (i.e., it is loud enough), and only produce a data signal from the electrical signal when the percussive sounds exceed the predefined amplitude. The predefined amplitude may be set manually, or automatically based at least in part on electrical signals received during ambient noise periods. In some embodiments, remote processor 120 may assist in determining when ambient noise periods are occurring based on acoustic/spectral signatures for ambient noise stored as additional reference signals.

Other conditions may also be used by local processor 140 to determine whether to initiate signal processing and communication of results to remote processor. Merely by way of example, local processor 140 may determine if the electrical signal indicates that a predefined frequency of the percussive sounds exceed a predefined amplitude and produce the data signal only when the predefined frequency of the percussive sounds exceed the predefined amplitude. As above, the predefined frequency and/or predefined amplitude may be set manually, or automatically based at least in part on electrical signals received during ambient noise periods. In some embodiments, remote processor 120 may assist in determining when ambient noise periods are occurring based on acoustic/spectral signatures for ambient noise stored as additional reference signals. In another example, the mere presence of a certain predefined frequency may also trigger signal processing.

In another embodiment of the invention, another system is provided for detecting and correlating percussive sounds with previously identified spectral signatures of a plurality of events so as to notify a user of an occurrence of a particular event. The system may include at least one processor and at least one non-transitory machine readable medium. The non-transitory machine-readable medium may have instructions thereon, which are executable by the at least one processor to perform the methods described herein.

Figure 2:
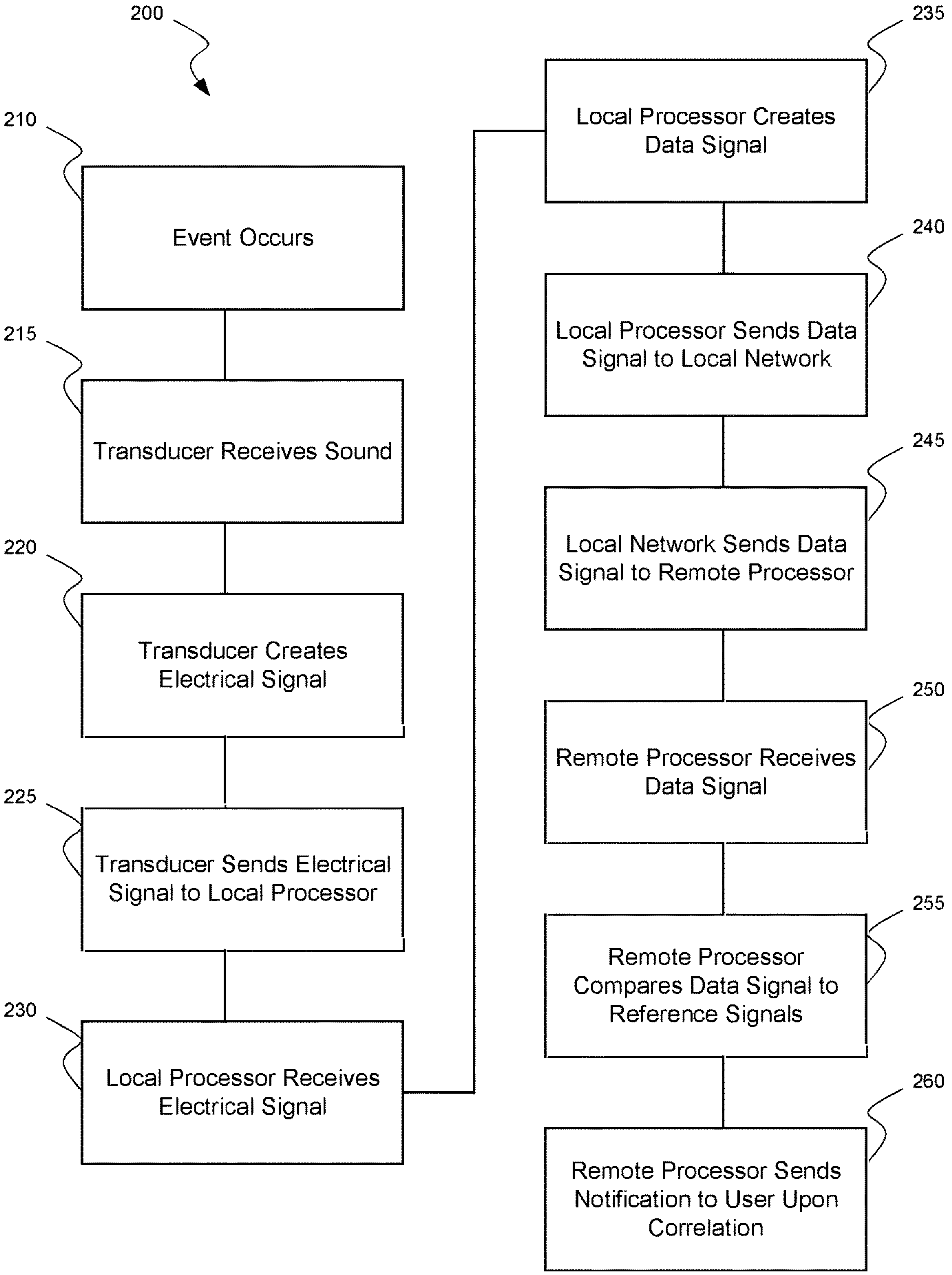
FIG. 2 is a block diagram view of an embodiment of one method embodiment of the invention for detecting and correlating percussive sounds with previously identified spectral signatures of a plurality of events so as to notify a user of an occurrence of a particular event.

In another embodiment of the invention, a method is provided for detecting and correlating percussive sounds with previously identified spectral signatures of a plurality of events so as to notify a user of an occurrence of a particular event. The method may include any of the steps performed by the components discussed herein. Merely by way of example, one possible method 200 of the invention is shown in FIG. 2.

In method 200, at block 210, an event occurs which produces a sound which vibrates through surface 138 to which sensing component 120 is attached. At block 215, transducer 130 may receive the sound. At block 220 transducer 130 creates an electrical signal in response. At block 225, transducer 130 sends the electrical signal to local processor 140.

At block 230 local processor 140 receives the electrical signal. At block 235, local processor 140 creates a data signal from the electrical signal. While in this embodiment this occurs at local processor 140, in other embodiments, any other component discussed herein my create the data signal from the electrical signal. At block 240, local processor 140 sends the data signal to the local network, including possibly semi-local router 170. At block 245, the local network sends the data signal to remote processor 120.

At block 250, remote processor 120 receives the data signal. At block 255, remote processor 120 compares the data signal to its available libraries of reference signals which are associated with certain events. At block 260, upon correlation of the data signal with a reference signal associated with a certain event, a notification specifying the determined event is sent to the user. The determined event should match the actual event from step 210 when the method functions correctly.

Figure 3:
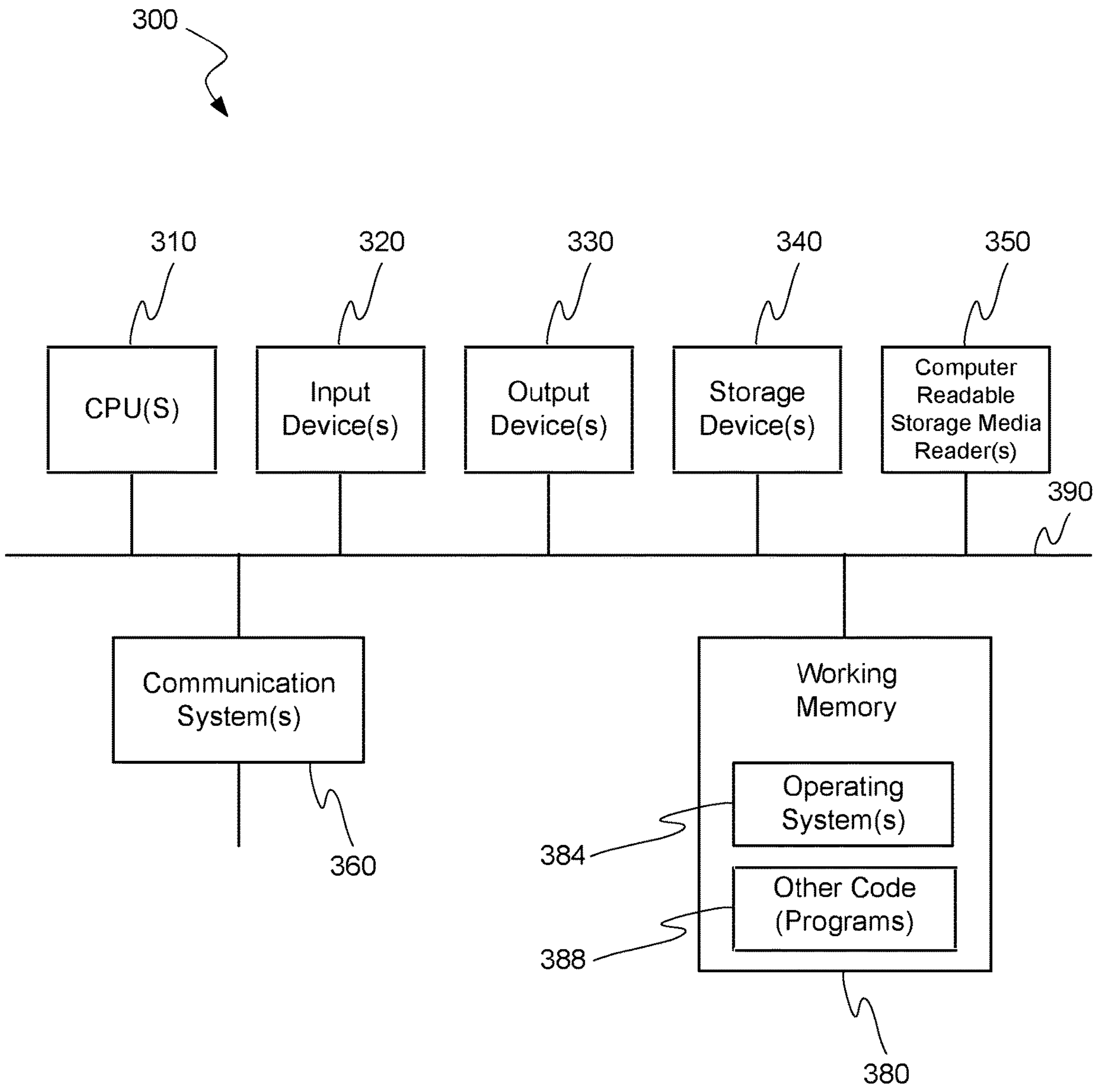
FIG. 3 is a block diagram of an exemplary computer system capable of being used in at least some portion of the apparatuses or systems of the present invention or implementing at least some portion of the methods of the present invention.

FIG. 3 is a block diagram illustrating an exemplary computer system 300 in which embodiments of the present invention may be implemented. This example illustrates a computer system 300 such as may be used, in whole, in part, or with various modifications, to provide the functions of sensor component 110, remote processor 120, and/or other components of the invention such as those discussed above. For example, various functions of local processor 140 may be controlled by computer system 300, including, merely by way of example, producing data signals, transmitting signals, and comparing data signals to reference signals, etc.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, the computer system 300 may also include a processing acceleration unit 370, which can include a digital signal processor, a special-purpose processor and/or the like.

The computer-readable storage media reader 350 can further be connected to a computer-readable storage medium, together (and, optionally, in combination with storage device(s) 340) comprehensively representing remote, local, fixed, and/or removable storage devices plus storage media for temporarily and/or more permanently containing computer-readable information. The communications system 360 may permit data to be exchanged with a network, system, computer and/or other component described above.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 300 may include code 388 for implementing any or all of the function of the various elements of the architecture as described herein. For example, software, stored on and/or executed by a computer system such as system 300, can provide the functions of sensor component 110, remote processor 120, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

The invention claimed is:

1. A system comprising:

a sensor comprising:

a transducer configured to convert a sound associated with an event into an electrical signal; and a processor configured to:

based on the electrical signal satisfying a threshold, determine, based on a spectral analysis of the electrical signal, a data signal representative of the electrical signal, and send the data signal to a computer, wherein the threshold is based on one or more other electrical signals received from the transducer during an ambient noise period, and wherein the ambient noise period is determined based on a comparison of the one or more other electrical signals to one or more reference signals indicative of ambient noise; and the computer configured to:

receive the data signal; and send, based on determining that the data signal is associated with the event, a notification indicative of the event.

2. The system recited in claim 1, wherein the threshold is associated with at least one of an amplitude of the sound or a frequency of the sound.

3. The system recited in claim 1, wherein the at least one reference signal indicative of ambient noise comprises a spectral signature associated with ambient noise.

4. The system recited in claim 1, wherein the spectral analysis comprises a Fourier transform.

5. The system recited in claim 1, wherein the transducer comprises a piezoelectric transducer.

6. The system recited in claim 1, wherein the determining that the data signal is associated with the event comprises determining that the data signal correlates to at least one reference signal associated with the event.

7. The system recited in claim 6, wherein the at least one reference signal associated with the event comprises a spectral signature associated with the event.

8. The system recited in claim 6, wherein the at least one reference signal associated with the event comprises one of a plurality of reference signals each associated with a different event.

9. The system recited in claim 1, wherein the event comprises an occurrence of at least one of: a doorbell sound, a smoke alarm sound, a carbon monoxide alarm sound, a security alarm sound, a door ajar alarm sound, a glass breaking sound, a door opening sound, a water flowing sound, or a collision sound.

10. The system recited in claim 1, wherein the notification comprises at least one of an email sent to a user or a message sent to a device associated with the user.

11. A method comprising:

receiving, from a transducer, an electrical signal indicative of a sound associated with an event;

determining, based on the electrical signal satisfying a threshold and based on a spectral analysis of the electrical signal, a data signal representative of the electrical signal; and sending the data signal, wherein the threshold is based on one or more other electrical signals received from the transducer during an ambient noise period, and wherein the ambient noise period is determined based on a comparison of the one or more other electrical signals to one or more reference signals indicative of ambient noise.

12. The method recited in claim 11, wherein the threshold is associated with at least one of an amplitude of the sound or a frequency of the sound.

13. The method recited in claim 11, wherein the spectral analysis comprises a Fourier transform.

14. The method recited in claim 11, wherein the transducer comprises a piezoelectric transducer.

15. The method recited in claim 11, wherein the sending the data signal comprises sending the data signal to a computer configured to determine whether the data signal correlates to at least one of a plurality of reference signals associated with one or more events.

16. The method recited in claim 11, wherein the event comprises an occurrence of at least one of: a doorbell sound, a smoke alarm sound, a carbon monoxide alarm sound, a security alarm sound, a door ajar alarm sound, a glass breaking sound, a door opening sound, a water flowing sound, or a collision sound.

17. A device comprising:

a transducer configured to convert a sound associated with an event into an electrical signal; and a processor configured to, based on the electrical signal satisfying a threshold, determine, based on a spectral analysis of the electrical signal, a data signal representative of the electrical signal, and send the data signal, wherein the threshold is based on one or more other electrical signals received from the transducer during an ambient noise period, and wherein the ambient noise period is determined based on a comparison of the one or more other electrical signals to one or more reference signals indicative of ambient noise.

18. The device recited in claim 17, wherein the threshold is associated with at least one of an amplitude of the sound or a frequency of the sound.

19. The device recited in claim 17, wherein the spectral analysis comprises a Fourier transform.

20. The device recited in claim 17, wherein the transducer comprises a piezoelectric transducer.

21. The device recited in claim 17, wherein the sending the data signal comprises sending the data signal to a computer configured to determine whether the data signal correlates to at least one of a plurality of reference signals associated with one or more events.

22. The device recited in claim 17, wherein the event comprises an occurrence of at least one of: a doorbell sound, a smoke alarm sound, a carbon monoxide alarm sound, a security alarm sound, a door ajar alarm sound, a glass breaking sound, a door opening sound, a water flowing sound, or a collision sound.

23. A non-transitory computer-readable medium storing instructions that, when executed, cause:

receiving, from a transducer, an electrical signal indicative of a sound associated with an event;

determining, based on the electrical signal satisfying a threshold and based on a spectral analysis of the electrical signal, a data signal representative of the electrical signal; and sending the data signal, wherein the threshold is based on one or more other electrical signals received from the transducer during an ambient noise period, and wherein the ambient noise period is determined based on a comparison of the one or more other electrical signals to one or more reference signals indicative of ambient noise.

24. The non-transitory computer-readable medium recited in claim 23, wherein the threshold is associated with at least one of an amplitude of the sound or a frequency of the sound.

25. The non-transitory computer-readable medium recited in claim 23, wherein the spectral analysis comprises a Fourier transform.

26. The non-transitory computer-readable medium recited in claim 23, wherein the transducer comprises a piezoelectric transducer.

27. The non-transitory computer-readable medium recited in claim 23, wherein the instructions that, when executed, cause sending the data signal comprise instructions that cause sending the data signal to a computer configured to determine whether the data signal correlates to at least one of a plurality of reference signals associated with one or more events.

28. The non-transitory computer-readable medium recited in claim 23, wherein the event comprises an occurrence of at least one of: a doorbell sound, a smoke alarm sound, a carbon monoxide alarm sound, a security alarm sound, a door ajar alarm sound, a glass breaking sound, a door opening sound, a water flowing sound, or a collision sound.

* * * * *